United States Patent [19]

Hulls

[11] Patent Number: 5,041,318

[45] Date of Patent: Aug. 20, 1991

[54] COMPOSITE STRUCTURAL MEMBER WITH INTEGRAL LOAD BEARING JOINT-FORMING STRUCTURE

[76] Inventor: John R. Hulls, 9 Lorraine, Point Reyes, Calif. 94956

[21] Appl. No.: 478,753

[22] Filed: Feb. 12, 1990

Related U.S. Application Data

[63] Continuation of Ser. No. 210,722, Jun. 23, 1988, abandoned.

[51] Int. Cl.⁵ .......................... B32B 3/02; B32B 3/06
[52] U.S. Cl. ....................................... 428/57; 428/76;
428/71; 428/109; 428/110
[58] Field of Search ...................... 428/57, 60, 71, 76, 428/109, 110; 296/29, 191, 181, 183, 901; 52/309.3, 309.11, 588; 244/131; 403/335–337

[56] References Cited

U.S. PATENT DOCUMENTS

| | | | |
|---|---|---|---|
| 3,397,496 | 8/1968 | Sohns | 52/309.11 |
| 3,905,167 | 9/1975 | Watkins et al. | 52/309.9 |
| 4,622,091 | 11/1986 | Letterman | 428/109 |

Primary Examiner—Alexander S. Thomas
Attorney, Agent, or Firm—Owen, Wickersham & Erickson

[57] ABSTRACT

A composite structural member includes a substantially planar composite panel portion and an integrally formed joint-forming edge structure along at least one edge of the panel portion. The joint-forming edge structure is adapted to be bonded to a complementing joint-forming edge structure of a complementing composite structural member to form a load-bearing joint structure that is capable of withstanding loads that the panel portion of the composite structural member is unable to withstand. A core material sandwiched between two composite skin layers makes up the panel portion of the composite structural member. The joint-facing edge structure may include a flange portion extending from one panel skin, a flange-receiving portion extending from the other panel skin, and a web portion extending between the flange portion and the flange-receiving portion. In one form of the invention, the flange and flange-receiving portions of the joint-forming edge structure each include at least one layer of composite material with high-strength fibers extending parallel to the joint-forming structure. This fiber orientation provides strength with respect to loads acting in the direction of the joint edge of the member. The web portion may include at least one layer of composite material with fibers oriented approximately perpendicularly to the joint-forming structure to provide strength with respect to hinging loads. The various portions of the joint-forming structure may also include preformed members made of either composite or non-composite material.

21 Claims, 7 Drawing Sheets

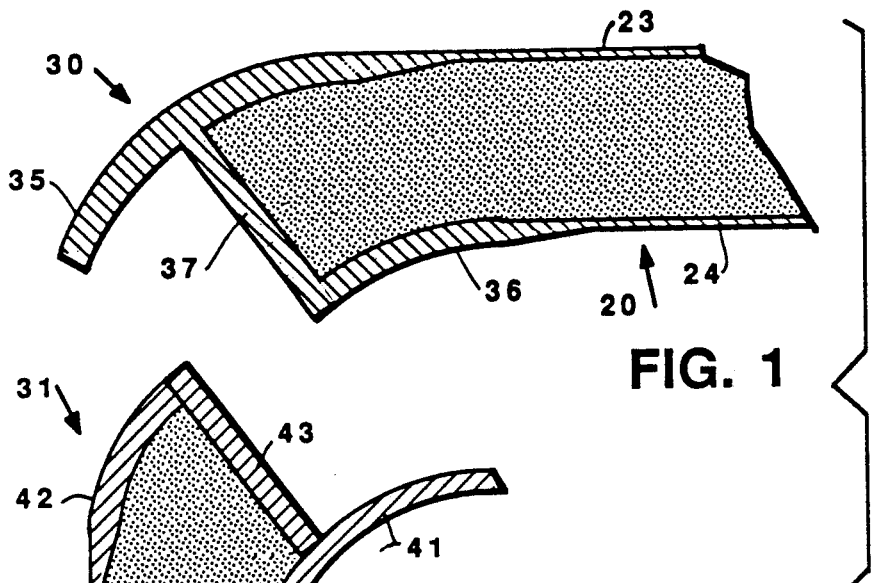
FIG. 1
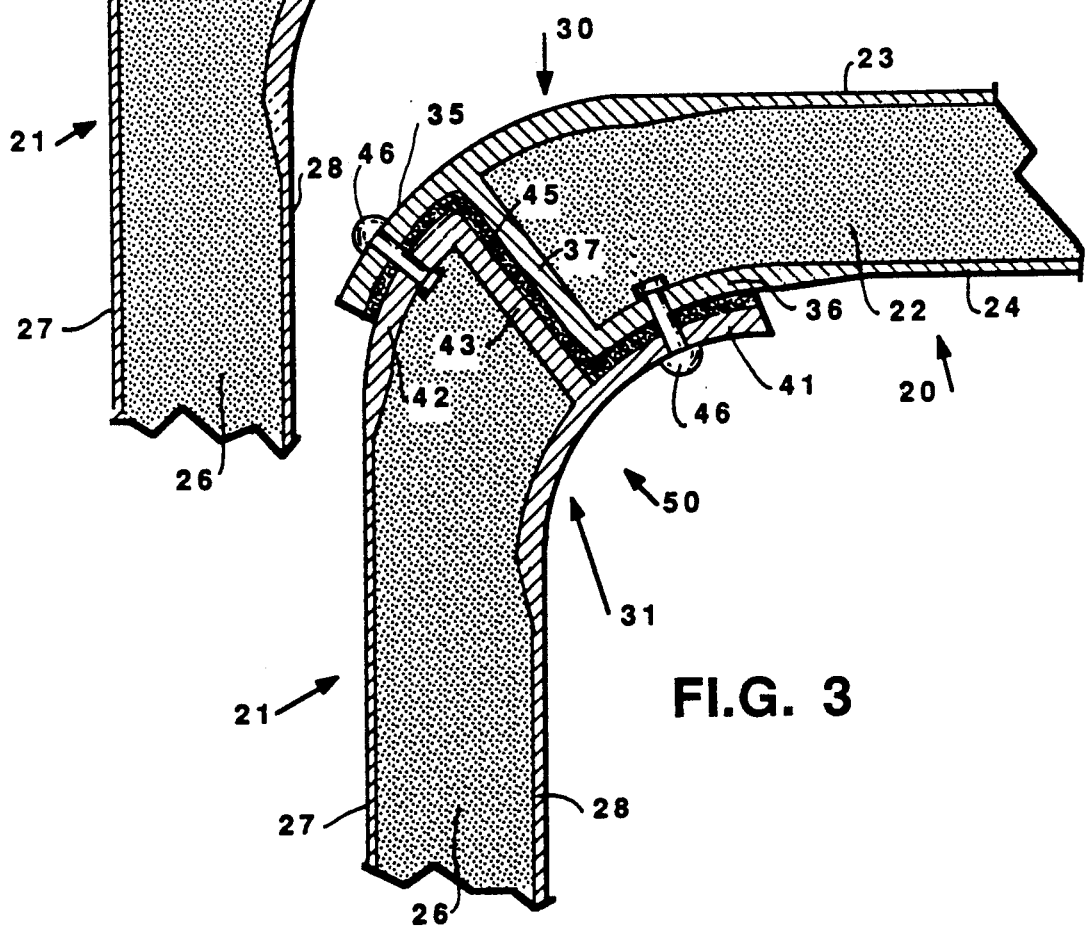
FI.G. 3

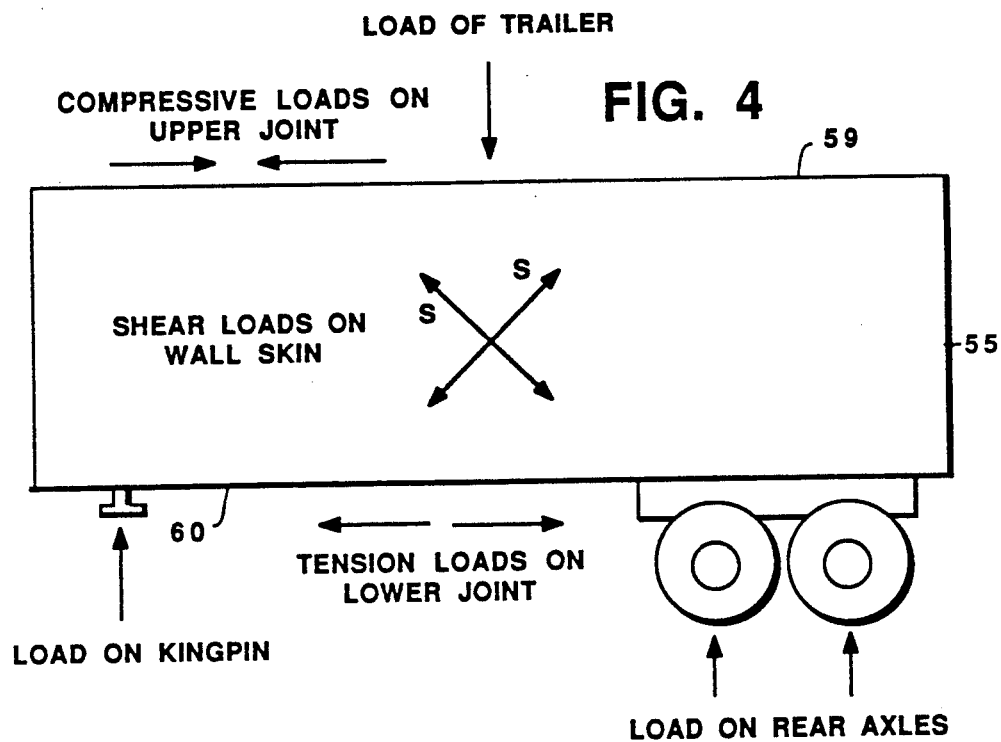
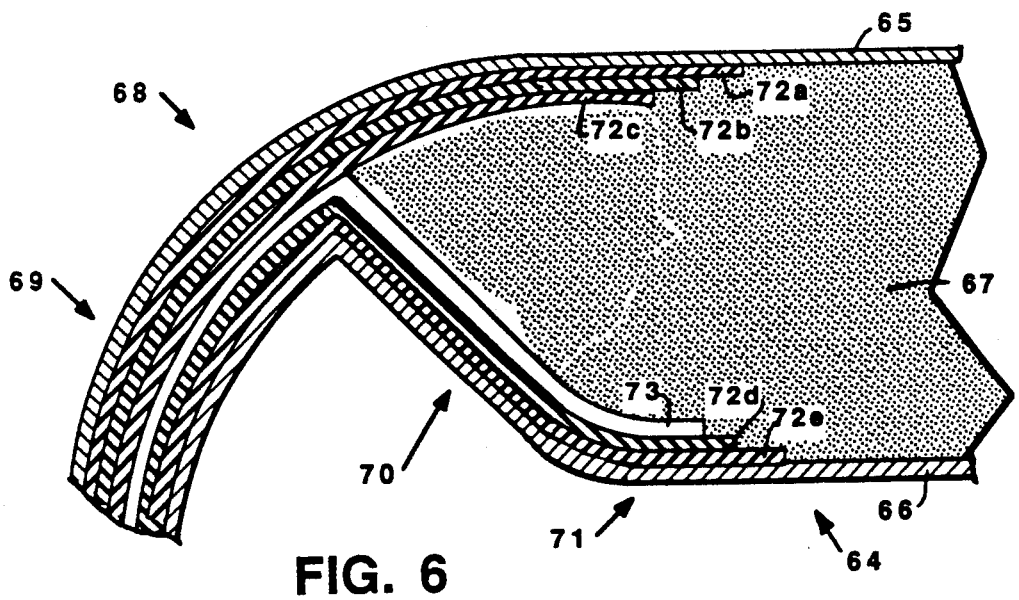

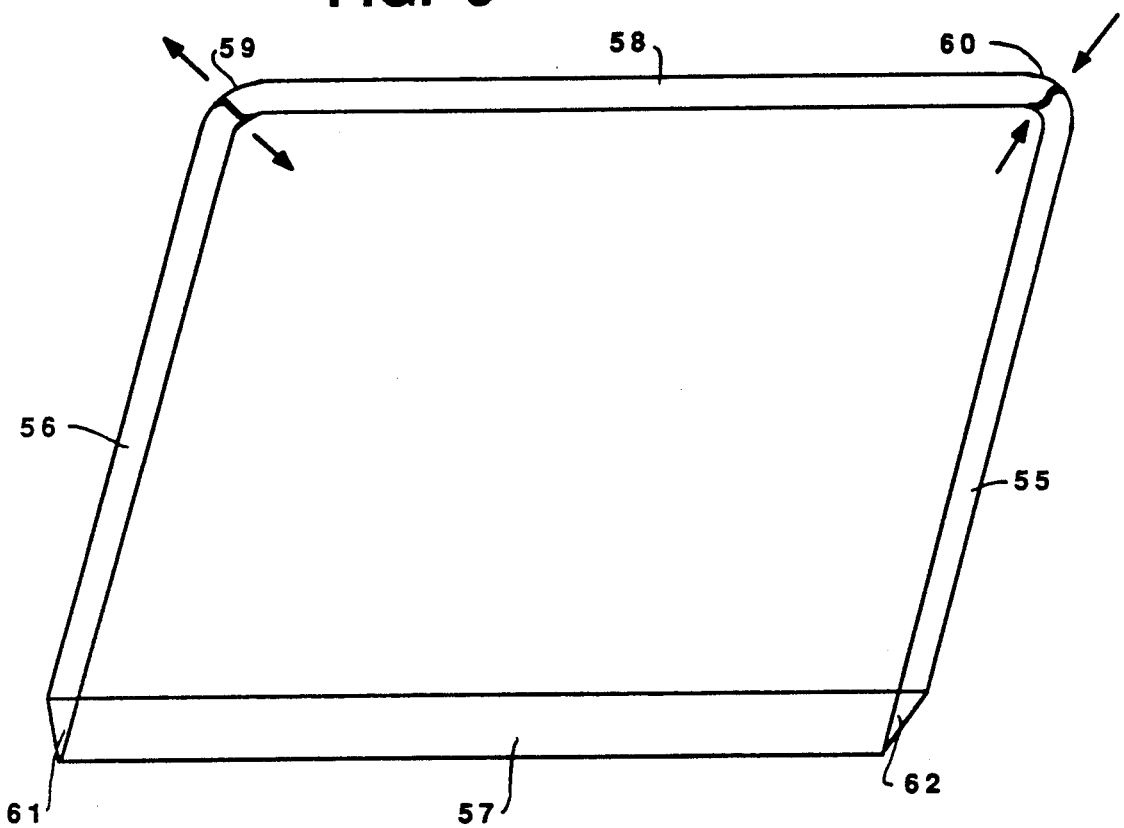
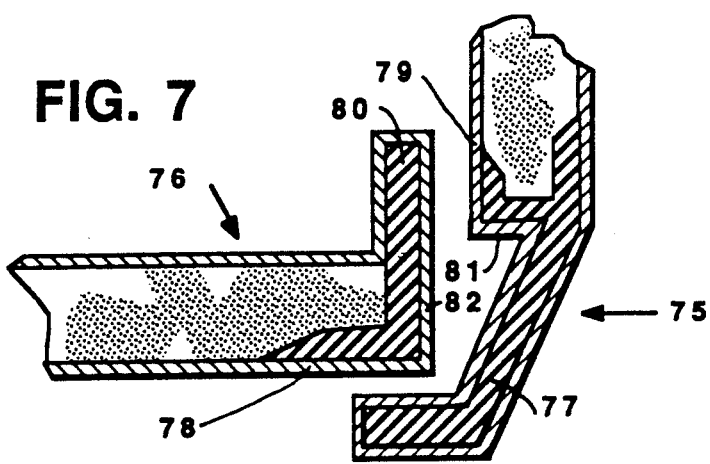

COMPOSITE STRUCTURAL MEMBER WITH INTEGRAL LOAD BEARING JOINT-FORMING STRUCTURE

This application is a continuation of application Ser. No. 07,210,722, filed June 23, 1988 abandoned.

The invention relates to composite structural members, particularly panel members, and structures made from such members. The invention encompasses composite structural members having a joint forming edge structure, method for making such composite structural members, and load bearing joint structures for composite structural members.

BACKGROUND OF THE INVENTION

Composite structural members such as panels made from composite materials are commonly used to form strong, yet lightweight structures. In their simplest forms, composite structural members comprise a number of fibers made of a high tensile and compressive strength material such as glass or carbon, encased within a suitable resinous material. Generally, a number of resin and fiber layers are required to provide a desired strength. More complex composite structural members include a core material sandwiched between sheets of material which may or may not be composites themselves. A "composite structure" for the purposes of this application, is a structure formed by joining two or more separate composite structural members.

Numerous structures are made up of a series of lightweight generally planar panel members that are joined together, usually along their edges. Since the panel members are thin and lightweight, they are not suited to withstand certain types of loads by themselves, compressive and tensile loads for example. Therefore, structures utilizing thin panel members often require other load bearing structural members for taking types of loads on the particular structure that the panel members are unable to withstand alone. A structure comprising a series of panel members and other load bearing members commonly takes advantage of the strengths of each type of member with regard to particular types of loads to produce a strong, yet lightweight structure.

A convenient example of such a structure is a semitrailer adapted for towing behind a truck tractor. Semitrailers are commonly made up of a thin roof panel, thin wall panels, and a somewhat heavier reinforced floor panel, connected together along the edges with corner members to form a box-like structure. Such a semitrailer structure is in the nature of a box beam in which the flat panels take shear loads, and the corner members take compressive and tensile loads.

Prior semitrailers have commonly been made of non-composite steel or aluminum panels that have been either rivetted or welded into an extrusion that formed the corners of the trailer box. This type of semitrailer body had a number of drawbacks. First, the structure required extensive riveting or welding in the panel joint areas, both of which made fabrication more expensive. Furthermore, a jig was required to position the various parts for joining. Also, the extrusion corner members had to have a relatively large cross-section in order to withstand the loads placed upon them, but were connected directly to the relatively thin panel members. The abrupt change in section made the joint subject to fatigue, and provided a stress riser in the structure. Furthermore, the structure had to be nearly square, thereby becoming an undesirable configuration with regard to both stress and aerodynamics.

Box beam structures such as the semitrailer example, have also been made from composite panel members. In the case of composite panel members, the panels were joined together by separate corner members that were not necessarily made of composite materials themselves. Similarly to the conventional metal panels, the composite panels took shear loads while the separately formed corner members took compressive and tensile loads. Structures comprised of composite panels and separate corner members suffered from problems similar to those associated with conventional metal trailer structures.

It is therefore an object of the invention to provide a composite structural member having an integrally formed composite joint-forming edge structure that can be bonded to a complementing joint-forming edge structure of another composite structural member to form a joint structure that is capable of withstanding types of loads that the composite structural members cannot withstand by themselves.

A further object of the invention is to provide a method for making a composite structural member with an integral joint- forming edge structure that, when bonded to a complementing joint-forming edge structure of another composite structural member, forms a load-bearing structure for taking loads that the composite structural members alone are incapable of withstanding.

Another object of the invention is to provide a method for joining composite structural members having complementing joint-forming edge structures.

SUMMARY OF THE INVENTION

The invention marks a departure from prior composite structural members in that the joining edges of panels pursuant to the invention cooperate to form a load-bearing structural member. The joining of two composite members pursuant to the invention requires no separate joining member. Rather, the composite members join together to form a joint member that structurally takes the place of prior separate joining members or other separate members that were required to assist the joined composite members in withstanding certain types of loads.

The invention includes a composite structural member with a joint-forming edge structure that is adapted to be bonded to a complementing joint-forming edge structure of another composite structural member to form a load-bearing structure between the two joined members.

In one preferred form of the invention, the composite structural member is a substantially planar panel. The panel comprises a layer of core material sandwiched between two skin layers. The skin layers are themselves made of composite material comprising a number of high-strength fibers such as glass or carbon fibers, encased in a hardened resin material.

The composite panel according to the invention also includes an integrally formed joint-forming edge structure along one edge that, when bonded to a complementing joint-forming edge of another panel, forms a joint structure that is capable of withstanding loads acting in the direction of the joint axis. That is, the joint structure is capable of taking compressive or tensile loads, as well as other loads on the composite structure that are not borne by the panels.

In one preferred form, each joint-forming edge structure includes a flange portion that extends from the sandwich portion of the composite panel, a web portion that extends from one panel skin to the other, and a flange-receiving portion integrally formed with and extending inward from the joint edge along the sandwich portion of the panel. The flange portion, the web portion, and the flange-receiving portion of the joint-forming panel edge are all made of composite material comprising high-strength fibers encased in a hardened resin similarly to the panel skins. The various portions of the joint-forming edge structure may include pre-cured composite members or even noncomposite members integrally formed in the edge structure to help provide a desired strength characteristic.

Pursuant to the invention, the joint-forming edge structure with its flange, web, and flange-receiving portions is adapted to be joined and bonded to a complementing panel with a complementing joint-forming edge structure to form a joint. The resulting joint, consisting of the two joint-forming edge structures of the two panels, forms a load-bearing structure that is capable of withstanding loads that the sandwich portion of either panel is unable to take without being damaged.

The flange, web, and flange-receiving portions of the panels may be configured in a number of different ways to form a load-bearing joint structure. In one preferred form of the invention, a flange portion, a web portion, and a flange-receiving portion of a first panel joint-forming edge is adapted to abut a flange-receiving portion, a web portion, and a flange portion, respectively, of a second panel joint. However, many other configurations are possible. For example, the flange portion of one panel pursuant to the invention may be adapted to abut the web and flange-receiving portions of a second panel. The flange, web, and flange-receiving portions of a joint-forming edge structure pursuant to the invention may be configured to be joined with a complementing joint-forming edge structure to form an I-beam, L, tube, or triangle structure, for example.

In one preferred form of the invention, the load-bearing joint structure is configured to resist loads that act in the direction of the joint axis, while the sandwich portion of each panel is constructed to resist shear loads. This form of the invention is suitable for use in forming a box beam structure, for example. However, since the joint-forming edge structures pursuant to the present invention are made up of composite materials, the various layers of the composite material may be arranged so as to provide strength with regard to a variety of different loads and not just loads acting along the joint axis.

In order to support the desired loads, the composite materials which form the skin, flange, web, and flange-receiving portions of the panels include high-strength fibers arranged so that they are placed substantially purely in tension or compression across their entire cross-section by the particular loads. The composite material of the panel skins in the form of the invention suitable for use in producing box beam structures, includes fibers oriented at an angle of about plus or minus 45° to the joint axis. This orientation of fibers places the fibers substantially in pure tension or compression in response to shear loading in the panels. The fibers are also preferably woven into a cloth to simplify the proper alignment during fabrication.

To resist loading in the direction of the joint axis, the flange, web, and flange-receiving portions of the joint-forming edge include composite material with at least one layer of fibers oriented at 0° to the joint axis. The fibers may be arranged in the form of a tape of unidirectional fibers or in the form of a woven cloth. Where the fibers are woven into a cloth, the layer will also include fibers oriented at some angle to the joint axis which will provide strength in another direction. The web portion of the joint-forming edge of each panel also includes at least one layer of fibers oriented at 90° to the joint axis. This fiber orientation to the joint axis helps resist hinging loads that act on the panels in the joint area in a transverse direction to the panel core. Hinging loads tend to urge the panel skins together, crushing the core, or to urge the skins apart, causing them to separate from the core material.

In preferred forms of the joint-forming panel edges, the flange, web, and flange-receiving portions, are each made up of several layers of resin encased fibers of the desired orientation to the joint axis. However, the skin of the panel sandwich portion may include only one layer of fibers. Thus there may be a build up in cross-section from the skins to the joint-forming portions that are integrally formed with the skins. Where there is a build up of several layers from the skin to the joint-forming portions of the edge structure, the layers are preferably staggered so that the cross-section builds up gradually. This gradual build up avoids sudden section changes where stress would concentrate and result in fatigue.

The invention also encompasses a method for making composite panels with a joint-forming edge structure. The method comprises laying up layers of composite material at particular fiber orientations in a suitable mold and then curing the layers by suitable means. In some forms of the invention, the method also includes laying up pre-cured composite members or noncomposite members along with the layers of composite material.

A mold for use in the method of the invention may be made of any material suitable for use with the particular resins that are used in the composite layers. A mold for use in forming a panel member, for example, includes a generally planar panel forming portion and a joint-forming-edge portion extending along at least one edge of the mold. The edge portion has a shape required to form the desired panel edge shape, that is, the desired configuration of flange, web, and flange-receiving portions, for example.

The method of making a composite panel pursuant to one preferred form of the invention, requires laying up in the mold a first skin layer of composite material over at least the panel-forming portion of the mold and extending somewhat into the joint-forming portion. In the preferred form of the invention, the skin layer extends over substantially the entire mold surface including both the panel-forming and the edge-forming portions. The fibers of the first skin layer are oriented at plus or minus 45° to the axis of the joint-forming edge of the mold. As previously discussed this fiber orientation provides the resulting sandwich panel portion with substantial strength with respect to shear loads.

After the first skin layer is laid up, at least one layer of joint-structure resin and fiber material is laid up over the edge-forming portion of the mold, but preferably extending somewhat into the panel-forming portion of the mold to provide a good overlap with the previously laid up skin layer. Each joint-structure layer includes fibers oriented at 0° degrees or parallel to the joint-forming edge of the mold. These fibers may be laid up in the form of a unidirectional tape or in the form of a woven cloth. In the case of a woven cloth the layer includes fibers that are not parallel to the edge of the mold and therefore provide strength with regard to loads other than tensile and compressive loads.

A core material is next laid up over the previously laid up composite layers in the mold. The core material covers substantially the entire panel-forming area of the mold, leaving a portion of the edge-forming layers extending along the edge-forming portion of the mold.

After the core material is in place in the mold, at least one web layer of composite material is laid up over the end of the core material that extends along the edge-forming portion of the mold. The fibers in this layer are oriented at 90°, or perpendicular, to the joint-forming edge of the mold. This fiber orientation resists forces acting transversely to the core material, such as hinging loads, which tend to crush the core material or pull the panel skins from the core material.

Also, after the core material is in position in the mold, at least one layer, and preferably several layers of joint-structure composite material are laid up over the entire edge portion of the mold and extend somewhat into the panel-forming portion of the mold, each layer including fibers oriented at 0° to the joint edge of the mold. These layers form part of the flange, web, and flange-receiving portions of the preferred form of the panel and cooperate with the earlier-laid-up joint-structure layers to enable the edge structure to resist loads acting in the direction of the joint.

Finally, another skin layer of composite material is laid up at least over the exposed core material and preferably extending over both the panel-forming and edge-forming portions of the mold. This skin layer, like the first skin layer, is laid up with fibers oriented at an angle of plus or minus 45° to the joint edge to give the sandwich portion of the panel substantial strength with respect to shear loads.

These and other objects, advantages, and features of the invention will be apparent from the following description of preferred embodiments, considered along with the accompanying drawings.

BRIEF DESCRIPTION OF THE DRAWINGS

FIG. 1 is a diagrammatic fragmentary view in section of portions of two composite panel members embodying the principles of the invention.

FIG. 3 is a diagrammatic view in section of the portions of the panel members of FIG. 1 bonded together to form a load-bearing joint structure pursuant to the invention.

FIG. 4 is a diagrammatic view in elevation of a common structure comprised of joined panel members and illustrating certain loads acting on the structure.

FIG. 5 is a diagrammatic view in transverse section illustrating hinging loads on the structure of FIG. 4.

FIG. 6 is an enlarged diagrammatic view in section of a joint edge of a panel member embodying the principles of the invention.

FIGS. 7, 8, 9, and 10 are diagrammatic views in section of alternate composite panel joint structures, each embodying the principles of the invention.

DESCRIPTION OF THE PREFERRED EMBODIMENTS

Figure 2:
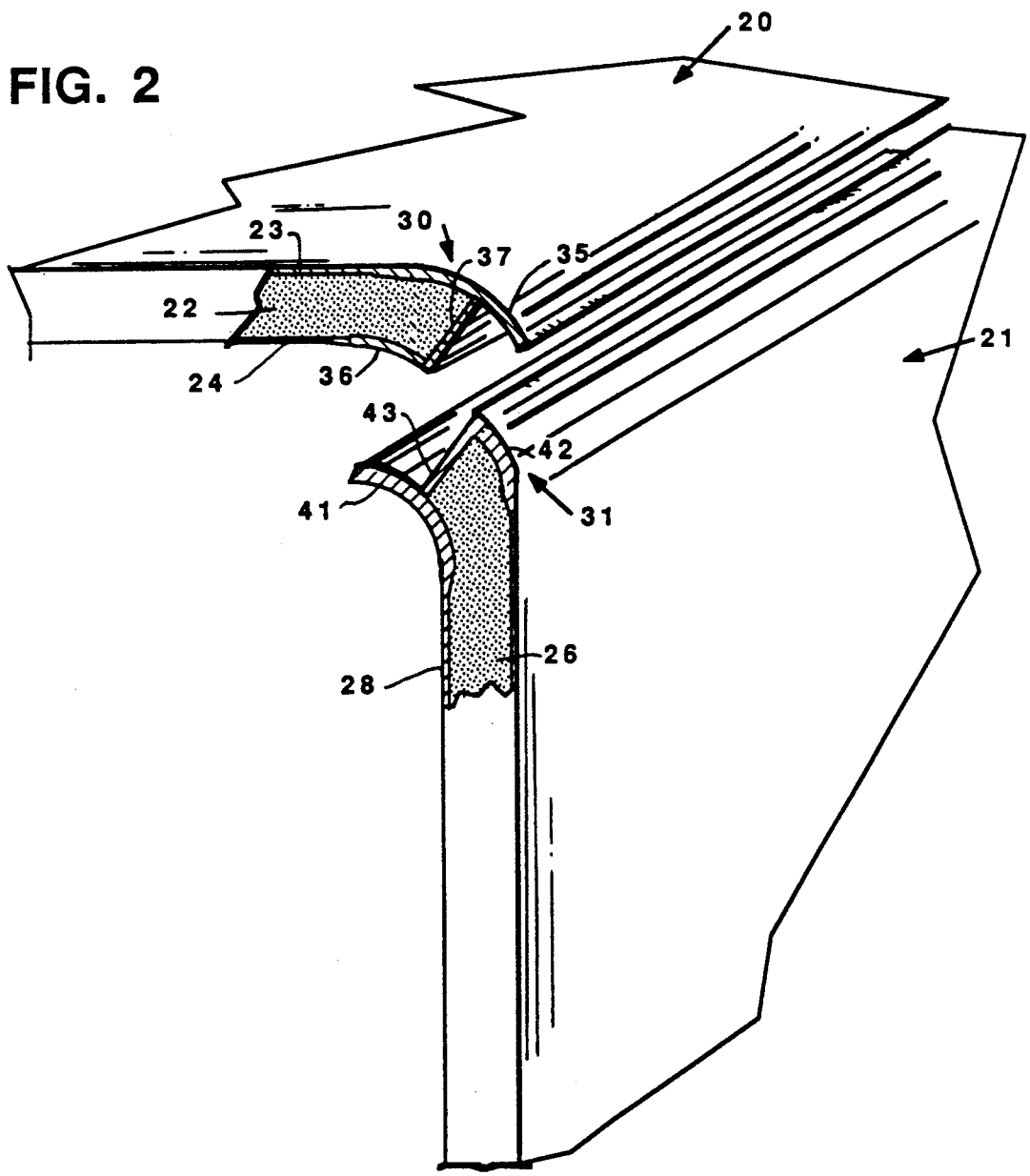
FIG. 2 is a view in perspective of a portion of the two composite panel members of FIG. 1.

FIGS. 1 and 2 illustrate an upper, horizontally oriented, composite panel member 20 and a lower, vertically oriented, panel member 21, each embodying the principles of the invention. The upper panel 20 comprises a core material 22 sandwiched between skins 23 and 24, each made of a composite material. The lower panel 21 is comprised of a core material 26 sandwiched between composite material skin layers 27 and 28. The panel 20 also includes a joint-forming edge structure 30 on at least one side thereof for joining with and forming a joint structure with a complementing joint-forming edge structure 31 of the lower panel 21.

The joint-forming edge structure 30 of the panel 20 includes a flange portion 35 extending from the panel skin 23, a flange-receiving portion 36 extending from the skin 24, and a web portion 37 extending between and connecting the flange portion 35 and the flange-receiving portion 36. The complementing joint-forming edge structure 31 of the panel 21 pursuant to the invention similarly includes a flange portion 41, a flange-receiving portion 42, and a web portion 43.

As best illustrated in FIG. 3, the joint-forming edge structure 30 of panel 20 is adapted to be joined with the complementing joint-forming edge structure 31 of panel 21. In the illustrated form of the invention, the flange portion 35 of panel 20 is adapted to abut the flange-receiving portion 42 of panel 21. The web portion 37 of panel 20 is adapted to abut the web portion 43 of the complementing panel 21. Finally, the flange-receiving portion 36 of the panel 20 is adapted to abut the flange portion 41 of the complementing panel 21. The abutted surfaces are preferably joined together with an adhesive bonding material layer 45 suitable for use with the particular type of composite material used to form the joint-forming edge structures. When a curable bonding material 45 is used, rivets 46 are used only to hold the two joint-forming edge structures 30 and 31 together while the bonding material layer 45 cures. The complementing edge structures pursuant to the invention mate together in the correct joining position and may easily be held together by the rivets 46 spaced out along the edges while a curable adhesive cures. Thus, the panels pursuant to the invention do not need a jig for holding them in proper position for joining.

The panels 20 and 21 join together by their joint-forming edge structures 30 and 31, respectively, as shown in FIG. 3 to form a joint structure 50 that is made up of the abutted flange and flange-receiving portions 35 and 42, the abutted flange and flange-receiving portions 41 and 46, and the abutted web portions 37 and 43. In the illustrated preferred form, the joint structure 50 generally forms an I-beam between the panels 20 and 21, the abutted web portions forming the body of the "I" and the abutted flange and flange-receiving portions forming the top and bottom of the "I" structure. This I-beam structure extends along a joint axis in position to take tensile and compressive loads which the planar sandwich portions of the panels are not suited to withstand.

One common example of a structure made up of a series of joined panels is a semitrailer, illustrated diagrammatically in FIGS. 4 and 5. The semitrailer body includes thin wall panels 55 and 56, a floor panel 57, and a roof panel 58, joined together by upper joints 59 and 60, and lower joints 61 and 62 to form a structure in the nature of a box beam. In this structure, the wall panels take shear loading, as indicated by the arrows S in FIG. 4, the upper joints 59 and 60 take compressive loads, and the lower joints 61 and 62 (FIG. 5) between the panels take tensile loads. It is desirable that the panels not be required to take tensile or compressive loads because of the amount of reinforcing material that would be required to give the panels sufficient strength over their entire area.

Referring to FIG. 6, the particular orientation of fibers may be described for a wall panel suited for use in the semitrailer structure (box beam) example illustrated in FIGS. 4 and 5.

The illustrated panel 64 includes an upper skin 65, a lower skin 66, and a sandwiched core material 67. The panel 64 also includes a joint-forming edge structure 68 having a flange portion 69, a web portion 70, and a flange-receiving portion 71. These portions 69, 70 and 71 are made up of the skin layers 65 and 66, and also a number of joint-structure layers 72a, 72b, 72c, 72d, and 72e, and a web layer 73, which provide the desired strength characteristics. Each layer is made of composite material comprising high-strength fibers encased in a resin.

The upper skin layer 65 includes fibers oriented at an angle of about plus or minus 45° to the axis of the joint-forming edge structure (the axis being approximately normal to the page of the drawing). The lower skin layer 66 also includes fibers oriented at plus or minus 45° to the joint axis, similarly to the upper skin layer 65. In a preferred form, the fiber material is woven into a cloth with the fibers extending at right angles to each other.

The joint-structure layers 72a, 72b, 72c, 72d, and 72e each include fibers oriented at 0° degrees to the joint axis, that is, the fibers extend normal to the page of the drawing, or parallel to the joint edge axis. This orientation of fibers provides substantial strength with regard to loads that act in the direction of the joint axis. In response to such loads the fibers of the layers 72a–e are placed either in compression across substantially their entire cross-section, or in tension across their entire cross-section. In a preferred form, the fibers are arranged in a tape for easy lay-up during fabrication of the panel. However, the layers 72a–e may also include fibers oriented at other angles to the joint axis, for providing strength with regard to loads other than those that act in the direction of the joint axis.

The web layer 73 in the illustrated embodiment comprises a composite layer with fibers oriented at 90° to the joint axis, that is, with each fiber oriented so as to extend parallel to the plane of the drawing. In this orientation, the fibers are placed in compression in response to a force that tends to press the two skin layers together. In response to a force that tends lift the panel skins from the core material, the fibers of the web layer 73 are placed in tension. The illustrated web layer 73 also extends across the flange portion 69 and the flange-receiving portion 71, and also provides a stiffening effect in the flange portion 69 and the flange-receiving portion 71.

In order to avoid a sudden change in cross-section from the panel skin 65 to the relatively thick joint-forming structure 68, the joint-forming layers 72a, 72b, and 72c are preferably staggered in from the panel skin layer 65. Also, the joint layers 72d and 72e, and the web layer 73 are preferably staggered in from the panel skin 66. The gradual build up in cross-section from the panel skin to the joint-forming edge structure avoids stress risers in the panel structure where stress would concentrate in use, and result in fatigue.

In an alternative form of the invention, any or all of the joint-structure layers 72a–c may be made of a preformed noncomposite material, such as a suitable metal. Similarly the joint forming layers 72d–e may also be made of preformed layers of composite material as may the web layer 73.

The preferred forms of the invention shown in FIG. 1 joins with its complementing panel and joint-forming edge structure to form an I-beam type load-bearing joint structure. However, numerous load-bearing joint structures are possible using panels with different configurations of flange, web, and flange-receiving portions.

FIG. 7 illustrates two complementing panels 75 and 76 that join together to form a generally triangular load-bearing joint structure. In this embodiment, a flange portion 77 of panel 75 is adapted to abut a flange-receiving portion 78 of the panel 76, and the flange portion 80 of panel 76 is adapted to abut the flange-receiving portion 79 of the panel 75. Note that the web portions 81 and 82 do not abut each other, but do form sides of the resulting triangular joint structure.

Figure 8:
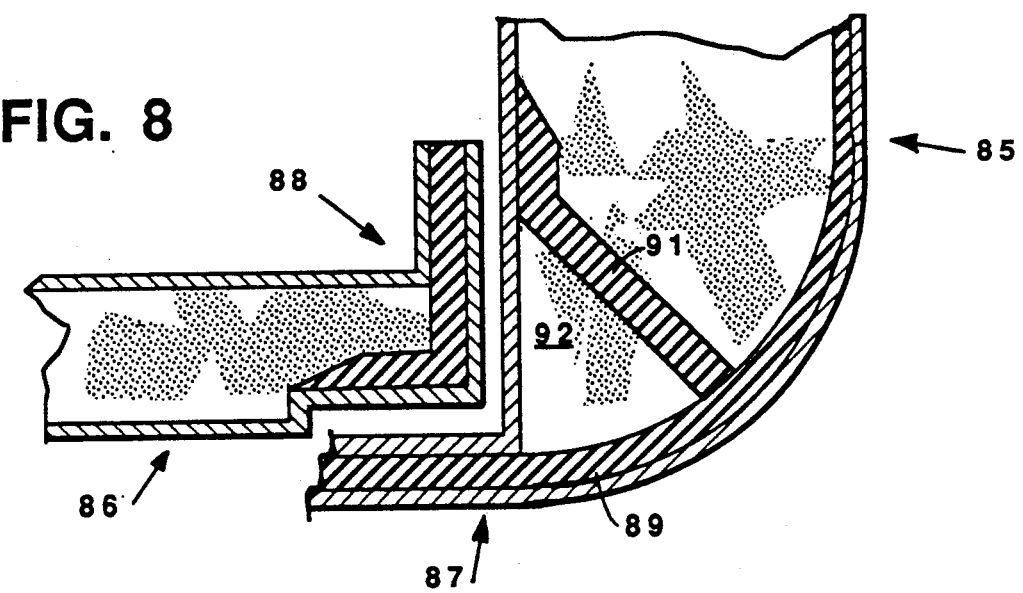

FIG. 8 shows another alternative pair of panels 85 and 86 pursuant to the invention. In this form the complementing joint-forming edge structures 87 and 88 are adapted to be joined to form another generally triangular shaped load-bearing joint structure. The flange portion 89 of panel 85 is curved to provide a curved outer joint surface. In this case, the web portion 91 of the panel 85 is internal to the panel, surrounded on either side by core material. In an alternate form, the core material 92 in the triangular structure may be added after the joint is formed rather that integrally formed with the panel 85 as shown.

Figure 9:
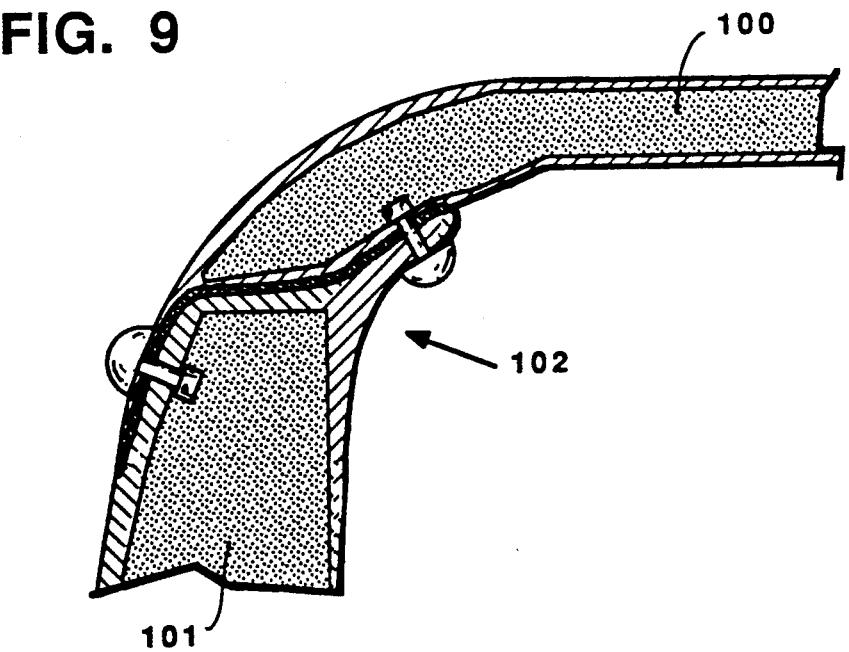

FIG. 9 illustrates two other forms of panels 100 and 101 pursuant to the invention, joined together to form a joint structure 102. This structure is somewhat similar to the I-beam structure shown in FIG. 3, but is stretched out, so as to approach an "L" or "T" shape.

Figure 10:
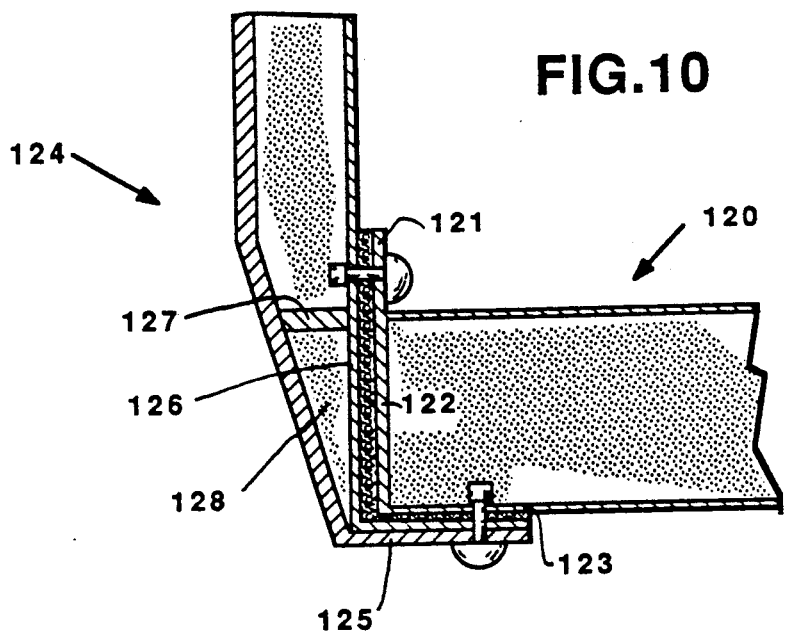

FIG. 10 shows an "L" shaped load-bearing joint structure. A panel 120 pursuant to the invention includes a flange portion 121, a web portion 122, and a flange-receiving portion 123. However, the panel 120 joins with its complementing panel 124 only along a flange portion 125, and a flange and web-receiving portion 126. The load-bearing "L" shape joint structure does not include a web portion of the panel 124. This alternate structure illustrates that the joint-forming edge structure of a panel pursuant to this invention need not include a flange, a flange-receiving, and a web portion. A joint-forming edge structure pursuant to the invention need only include one joint-forming surface adapted to be bonded with a complementing joint-forming edge structure to form a load-bearing joint structure of some shape suited to resist some desired loads that the composite panel itself is unable to withstand.

The panel 124 in FIG. 10 does preferably include a web portion 127. However, the composite web layer (or layers) 127 preferably contains fibers oriented at 90° to the joint axis to resist hinging loads on the joint that would tend to crush the core material in a region 128 or separate the skins of panel 124 from the core material. In an alternate form of the invention, also shown in FIG. 10, a more dense and crush resistant core material may be used in the region 128 instead of, or in addition to a web, to provide resistance to crushing loads. In still another form of the invention, the web layer 127 may be a preformed noncomposite material encapsulated in composite layers which make up the joint forming edge structure.

The invention also encompasses methods for making a composite panel with a joint-forming edge structure. A preferred method of making a panel pursuant to the invention can be described with reference to FIG. 11. To produce the illustrated panel member, which is similar in shape to the panel member 20 in FIG. 1, the method employs a mold 140 having a generally planar panel-forming portion 141 and a joint-edge-forming portion 142 with an axis extending approximately normal to the sheet of the drawing. The method includes laying up a number of layers of composite material in the mold 140, the layers having particular fiber orientations to obtain the desired strength characteristics in the resulting panel.

As used in this specification, including the claims, the term "laying up" is used to mean arranging or applying a layer of composite material or other material in a mold in any way suitable for applying the layer. For example, where a layer comprises a resin encased fiber material, the fibers may be arranged at the desired orientation and then impregnated or encapsulated in a layer of suitable resinous material. Alternatively, the fibers may be arranged in pre-impregnated sheets that need only be placed in the mold with the desired fiber orientation. Also, in some forms of the invention, preformed members and core material may be laid up in the mold. In the case of preformed members and core material, "laying up," in the context of this specification, shall mean applying the preformed member (composite or noncomposite) by any suitable manner. For example, the preformed member may be pressed into a previously laid up resin layer, or may be fixed in position with a suitable resin coating.

The preferred method includes laying up in the mold 140 at least one first skin layer 145 of composite material with fibers oriented at about plus or minus 45° to the axis of the edge-forming portion 142 of the mold 140. In the illustrated method, the skin layer 145 is laid up over both the panel-forming portion 141 and the edge-forming portion 142 of the mold. Although a 45° orientation is preferred for providing resistance to shear forces in the resulting panel, other orientations may be used to provide resistance to other loads, depending on the intended use of the panel.

The next step in the preferred method includes laying up one or more joint-structure layers of composite material in the mold 140 over the edge-forming portion 142. In the form of the invention illustrated in FIG. 11, two joint-structure layers 147a and 147b are laid up in the mold 140. These joint-structure layers 147a and 147b are preferably staggered at their edges to gradually build up cross-sectional area from the skin layer 145 to the edge structure 148 of the completed panel. Also, the joint-structure layers 147a and 147b are preferably laid up with fibers oriented at 0° to the edge-forming portion 142 of the mold 140, that is, so that the fibers would extend approximately normal to the plane of the drawing. This orientation of fibers in the layers 147a and 147b produces a panel suitable for use in box beam structures as discussed previously.

The method next includes laying up at least one layer of core material 150 in the mold over the panel-forming portion 141 after the joint-structure layers 147a and 147b are laid up. In the illustrated preferred form of the invention, the core material 150 includes a contoured edge that extends into the edge-forming portion 142 of the mold. In other forms of the invention a contoured core material may not be necessary.

A web layer 153 is then laid up in the mold 140 over at least the end of the core material 150 and preferably extending from the panel-forming portion 141 of the mold to the joint-edge-forming portion 142. This web layer 153 may be laid up with fibers oriented at about 90° to the joint-edge-forming portion 142 of the mold 140 to resist hinging loads as previously discussed.

Next, the method of making the illustrated panel includes laying up at least one more joint-structure layer 147c of composite material at least over the joint-edge-forming portion 142 of the mold 140. As shown in FIG. 10 the layer 147c preferably extends over the joint-edge-forming portion 142 and over the panel-forming portion 141. As with the joint-structure layers 147a and 147b, the layer 147c may be laid up with fibers oriented at 0° to the axis of the joint-edge-forming portion 142 of the mold to produce desired strength characteristics in the completed composite panel.

At least one second skin layer 155 of composite material is then laid up at least over the panel core 150. In the preferred panel illustrated in FIG. 11, the second skin layer 155 is laid up over the panel-forming portion 141 of the mold 140 as well as the edge-forming portion 142. However, the second skin layer 155 may extend over only the panel portion 141. As with the first skin layer, the second skin layer may include fibers oriented at about plus or minus 45° to the axis of the edge-forming portion 142 of the mold to provide strength with respect to shear loads.

Finally, after all of the desired resin and fiber layers are properly laid up in the mold, the layers are cured by any suitable means, and after curing, the completed panel may be removed from the mold for use. The step of curing the resin depends on the particular resin system being used. Some resin systems that may be employed in the present invention are adapted for curing at room temperatures, while some require elevated temperatures for curing. In the case of elevated temperature curing resin systems, the step of curing includes heating the layers by some suitable means such as by an oven operating at a particular curing temperature or energy level.

Certain thermoplastics can also be used to encase the fiber layers used in the invention. Where thermoplastics are used, the desired layers are placed in the mold, heated to some molding temperature, and then formed into the desired structure shape with a suitable press.

According to the method of the invention it is not necessary that all of the resin layers by cured simultaneously as described in the embodiment of the invention set forth above. Rather, some layers may be cured separately, before additional layers are laid up in the mold.

Also, a variety of different fiber materials may be used to form the various composite layers of the invention. For, example, the fibers may be made of glass, S-glass, Kevlar, or carbon. Furthermore, some high-strength fabrics, suitable for use in the invention may be pre-impregnated with a resin material. Where such pre-impregnated fabrics are used, the layers are laid up in the mold at the desired fiber orientations without having to add additional resin.

Figure 12:
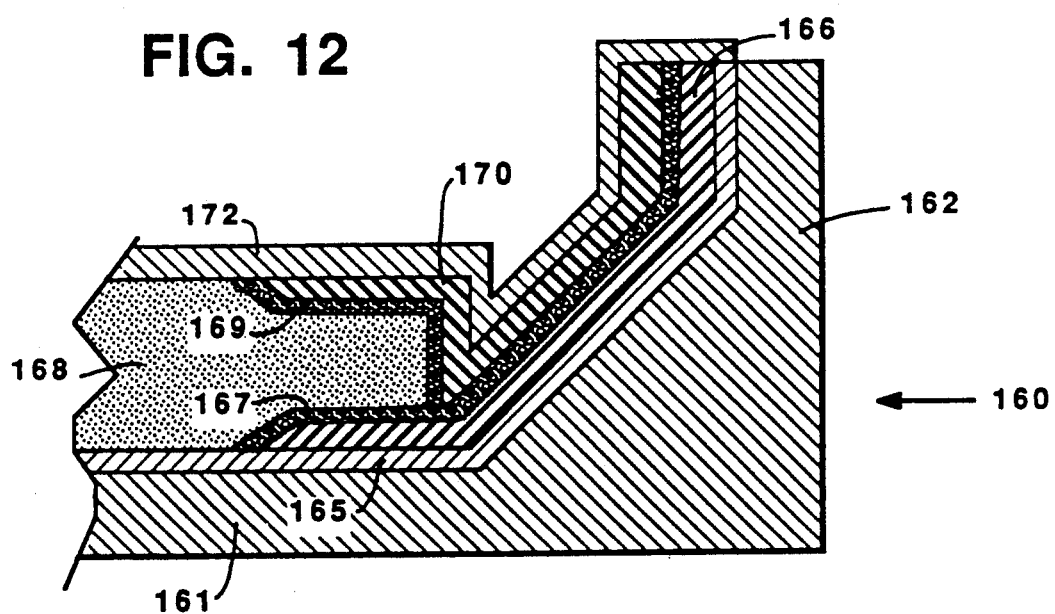
FIG. 12 is a diagrammatic view in section of the joint edge portion of an alternative composite panel that include preformed joint-structure members.

FIG. 12 may be used to describe an alternative method of the invention in which preformed joint-structures are used to provide the joint-forming edge structure with its desired strength characteristics. The panel member made in this method is similar in structure to the panel 75 shown in FIG. 7. The panel member shown in FIG. 12 requires a mold 160 having a panel-forming portion 161 for forming a generally planar panel and a joint-edge-forming portion 162 for forming the desired joint-forming edge structure.

Figure 11:
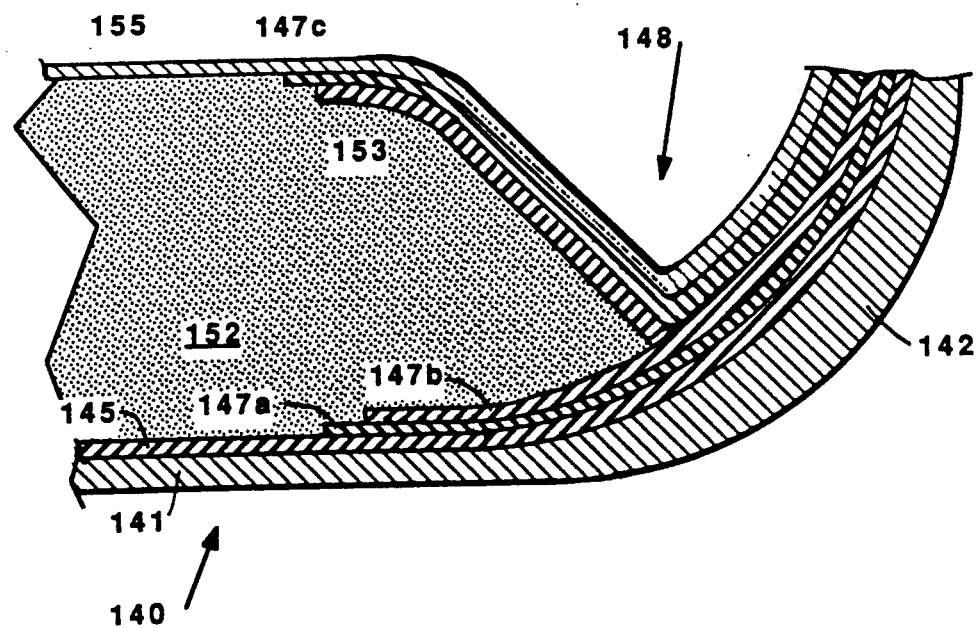
FIG. 11 is a diagrammatic view in section of the joint edge portion of a composite panel according to the invention laid up in a mold pursuant to the invention.

Similarly to the method previously described in connection with FIG. 11, the first step of this alternative form of the invention includes laying up a first skin layer 165 of composite material in the mold, at least over the panel portion 161 of the mold, and preferably over both the panel portion and the edge forming portion 162 as shown. The fibers which make up the first skin layer may be oriented at plus or minus 45° to the joint axis (the joint axis extending approximately normal to the plane of the drawing) to enhance the strength of the panel portion of the resulting composite member with respect to shear loads. Other orientations may be used to provide other desired strength characteristics.

After the first skin layer 165 is laid up in the mold, the method includes the step of laying up at least one preformed joint-structure member 166 in the mold over at least the joint-edge-forming portion 162 of the mold. The step of laying up the joint-structure member 166 includes applying a suitable bonding material 167 over it upper surface. The preformed joint-structure member provides desired strength characteristics in the joint-forming edge structure of the resulting panel and thus serves the same purpose as the joint-structure layers of composite material shown in FIG. 11. The joint-structure member may be made of pre-cured composite material or may alternatively be made of a suitable structural metal such as aluminum or steel.

The method next includes laying up at least one layer of core material 168 in the mold over the panel-forming portion 161 of the mold, and laying up at least one more preformed joint-structure member 170 in the mold over the joint-edge-forming portion 162. This latter step of laying up the member 170 includes applying a suitable bonding material 169 over the core material prior to positioning the member 170 in the mold. Both bonding material layers 167 and 169 are preferably a curable resin similar to, or the same as that used in laying up the first skin layer 165. The bonding material serves to bond the preformed joint-structure members, 166 and 170 respectively, and the core material 168 together along their abutted surfaces, and when cured, form a unified structure. In this form of the invention the core material 168 shown is routed slightly to accommodate the base and upper joint-structure members.

The method next includes laying up a second skin layer 172 of composite material over the panel-forming portion of the mold and the joint-edge-forming portion 162. Note in this form of the invention the second skin layer 172 extends over the end of the flange portion of the resulting structure, so as to completely encapsulate the preformed members 166 and 170 within the first skin 165 and the second skin 172.

The final step in the method of making the panel illustrated in FIG. 12 includes curing the uncured resin material in the laid up skin layers 165 and 172, and also curing the bonding material 167 and 169 used in laying up the joint-structure members 166 and 170. After curing, the completed panel member may be removed from the mold 160 for use. As with the previously described method the step of curing depends upon the particular resin system used to form the composite layers 165 and 172 and the particular type of bonding material used.

The above-described preferred embodiments are intended to illustrate the principles of the invention, but not to limit the scope of the invention. Various other embodiments and modifications to these preferred embodiments may be made by those skilled in the art, without departing from the scope of the following claims.

What is claimed is:

1. A composite structure comprising:
   a first substantially planar composite panel portion having a core material sandwiched between a first composite skin layer and a second composite skin layer;
   a second substantially planar composite panel portion having a core material sandwiched between a first composite skin layer and a second composite skin layer;
   a first joint-forming edge structure integrally formed with, and extending along a first edge of the first composite panel portion including a first panel web edge portion for carrying a load between and extending between said first skin layer and said second skin layer of said first joint-forming edge structure at said first edge, said first joint-forming edge structure including a first composite flange portion extending from said first skin layer of said first joint-forming edge structure;
   a second joint-forming edge structure integrally formed with, and extending along a second edge of the second composite panel portion including a second panel web edge portion for carrying load between and extending between said first skin layer and said second layer of said second joint-forming edge structure at said second edge, said second joint forming edge structure including a second composite flange portion extending from said second layer of said second joint-forming edge structure,
   wherein the first joint-forming edge structure is jointed with the second joint-forming edge structure through the first web edge portion of said first panel portion and the second web edge portion of said second panel portion to form a corner of said structure along a joint axis wherein said first flange portion of said first joint-forming edge structure is oriented to overlap a first flange receiving portion of said first composite skin layer of said second panel such that when said first flange portion is joined to said first flange receiving portion of said first skin layer of said second panel by a first connecting means a load carried by said first skin layer of said first panel is carried through said first connecting means to said first skin layer of said second panel by said first connecting means, and said second flange portion of said second joint forming edge structure is oriented to overlap a second flange receiving portion of said second composite skin layer of said first panel such that when said second flange portion is joined to said second flange receiving portion of said second composite skin layer of said first panel by a second connecting means a load carried by said second skin of said first panel is carried through said second connecting means to said second layer of said second skin layer of said second panel.

2. The composite structure of claim 1 wherein the first and second flange portions each includes a preformed joint-structure member.

3. The composite structure of claim 1 wherein the first and second flange-receiving portions each includes a preformed joint-structure member.

4. The composite structure of claim 1 wherein the first and second web edge portions each includes a preformed joint-structure member.

5. The composite structure of claim 1 wherein the first and second flange portions, the first and second flange-receiving portions and the first and second edge web portions each includes at least one joint-structure layer of composite material.

6. The composite structure of claim 5 wherein the first and second flange portions, the first and second flange-receiving portions and the web edge portions each includes a plurality of joint-structure layers of composite material, and the edges of said layers are staggered so as to gradually build up cross-sectional area from the skin layers toward the first and second flange and first and second flange-receiving portions.

7. The composite structure of claim 5 wherein each joint-structure layer of the joint-forming edge structure includes substantially linear fibers of high-strength material extending approximately parallel to the joint-forming edge structure.

8. The composite structure of claim 1 wherein the first and second web edge portion each includes at least one layer of composite material.

9. The composite structure of claim 8 wherein each web edge layer includes substantially linear fibers of high-strength material that extend approximately perpendicularly to the joint-forming edge structure.

10. The composite structure of claim 1 wherein the first and second composite skin layers include substantially linear fibers of high-strength material oriented at an angle of about plus or minus 45° to the joint-forming edge structure.

11. The composite structure of claim 1 wherein:
said first joint-forming edge structure being "L" shaped including the edge of said first panel portion, said first flange portion extends perpendicularly from the first skin layer, and a portion of the second skin layer of the panel, and
said first web edge portion being coincident with said first joint-forming edge structure,
further wherein said second structural member includes a substantially "C" shaped joint-forming edge structure with the second web edge portion coincident therewith to form a triangularly shaped region between the second joint-forming edge structure of the second structural member and a horizontal portion and a vertical portion of the "C" shape of the second joint-forming edge structure of the second structural member.

12. The composite structure of claim 1 wherein:
said first joint-forming edge structure is substantially "C" shaped with said first skin layer of said first panel portion forming the outer surface of a vertical portion and a lower horizontal portion of the "C" shape and a lower horizontal arm extending beyond a plane of said second skin layer of said first panel portion to form a flange, said second skin layer of said first panel portion forming a set of inner surface of the "C" shape to create a substantially triangularly shaped region between the vertical and upper horizontal portions of the "C" shape, and
said first web edge portion being coincident with said joint-forming edge structure,
further wherein said second structural member includes the second joint-forming edge structure that is substantially "L" shaped with the second web edge portion that is substantially coincident with said second joint-forming edge structure.

13. A composite structure for forming a corner on an enclosure, said structure comprising;
a first composite structural member having a first panel portion and a first joint-forming edge structure integrally formed on a first edge thereof, said first joint-forming edge structure includes a first web portion adjacent a first joint forming edge, said first panel portion including a core material sandwiched between a first skin layer of composite material and a second skin layer of composite material with said first web portion extending between said first skin layer and said second skin layer of said first panel portion for carrying a load between said first skin layer and said first joint-forming edge structure includes a first composite flange portion extending from said first skin layer of said first panel portion; and
a second composite structural member having a second panel portion and a second joint forming edge structure integrally formed on a second edge thereof, said second joint-forming edge structure includes a second web portion adjacent to a second joint-forming edge, said second panel portion including a core material sandwiched between a first skin layer of composite material and a second skin layer of composite material with said second web portion extending between said first skin layer and said second skin layer of said second panel portion for carrying a load between said first skin layer and second skin layer, said second joint-forming edge structure includes a second composite flange portion extending from said second skin layer of said second panel portion,
wherein the first joint-forming edge structure of the first composite members is bonded with a bonding material to the second joint forming edge structure of the second composite member so as to form a corner of said enclosure along a joint axis, such that said first flange portion is bonded to a first flange receiving portion of said first layer of said second panel portion and said second flange portion is bonded to a second flange receiving portion of said second layer of said first panel portion and the first and second web portions of said first and second structural members are bonded together such that a load carried by said second skin of said first panel is carried through said second connecting means to said second layer of said second skin layer of said second panel and said core material of said first and second structural members are not subject to that loading.

14. The composite structure of claim 13 wherein the composite skin layers of the first and second composite structural members include substantially linear, high-strength fibers oriented at an angle of about plus or minus 45° to the joint axis.

15. The composite structure of claim 14 wherein the first joint-forming edge structure and the second joint-forming edge structure each include at least one layer of composite material with high-strength fibers extending parallel to the joint axis.

16. The composite structure of claim 13 wherein the first and second web portions each includes at least one layer of composite material with high-strength fibers extending approximately perpendicular to the joint axis for providing strength with regard to hinging loads on the joint structure.

17. The composite joint structure of claim 13 wherein the first joint-forming edge structure of the first composite structural member and the second joint-forming edge structure of the second composite structural member each include a preformed joint-structure member.

18. The composite joint structure of claim 13 wherein the first joint-forming edge structure of the first composite member and the second joint-forming edge structure of the second composite structural member are bonded together to form a load-bearing joint structure having generally an I-beam configuration.

19. The composite joint structure of claim 13 wherein the bonding material that bonds the first joint-forming edge structure and the second joint-forming edge structure together is a curable bonding material, and including a plurality of rivets extending through the first joint forming edge structure and the second joint-forming edge structure for holding them together in a proper joint-forming position when the bonding material is uncured.

20. The composite structure of claim 13 wherein:
said first member includes an "L" shaped first joint-forming edge structure that includes the edge of said panel, the first flange extends perpendicularly from the first skin layer, and a portion of the second skin layer of the first panel, and said first web edge portion is coincident with said first joint-forming edge structure, and
said second member includes said second joint-forming edge structure being substantially "C" shaped with said second skin layer forming the outer surface of a vertical portion and a lower horizontal portion of the "C" shape and the lower horizontal portion extends beyond a plane of the second skin layer forming a set of surfaces of the "C" shape to create a substantially triangularly shaped region between the vertical and a set of inner horizontal portions of the "C" shape.

21. A composite structure comprising
a core having a first side and a second side, said first side being generally parallel with said second side;
first skin means for transmitting forces attached to said first side of said core;
second skin means for transmitting forces attached to said second side of said core; and
first web means for transmitting force from said first skin means to said second skin means through said core, said first web means dividing said core into a first core portion and a second core portion and connecting said first skin means to said second skin means,
wherein said first skin means comprises a first skin portion and a second skin portion, wherein said second skin portion is attached to said first core portion and extends to said first web means and said first skin portion is generally attached to said second core portion and has an overlapping first skin portion extending past said web overlapping said second skin portion for a predetermined distance on a first core side of said first web means and said overlapping first skin portion is connected to said second skin portion by a first connection means,
wherein said second skin means comprises a third skin portion and a fourth skin portion, wherein said fourth skin portion is attached to said second core portion and extends to said first web means and said third skin portion is generally attached to said first core portion and has an overlapping third skin portion extending past said web overlapping said fourth skin portion for a predetermined distance on a second core side of said first web means and said overlapping third skin portion is connected to said fourth skin portion by a second connecting means,
wherein said first web means comprises a first core web and a second core web, wherein said first core web is attached to said first core portion and connects said second skin portion with said third skin portion, wherein said second core web is attached to said second core portion and connects said first skin portion with said fourth skin portion.

* * * * *